(No Model.)
W. H. KNIGHT.
ELECTRIC MOTOR.
No. 338,085. Patented Mar. 16, 1886.
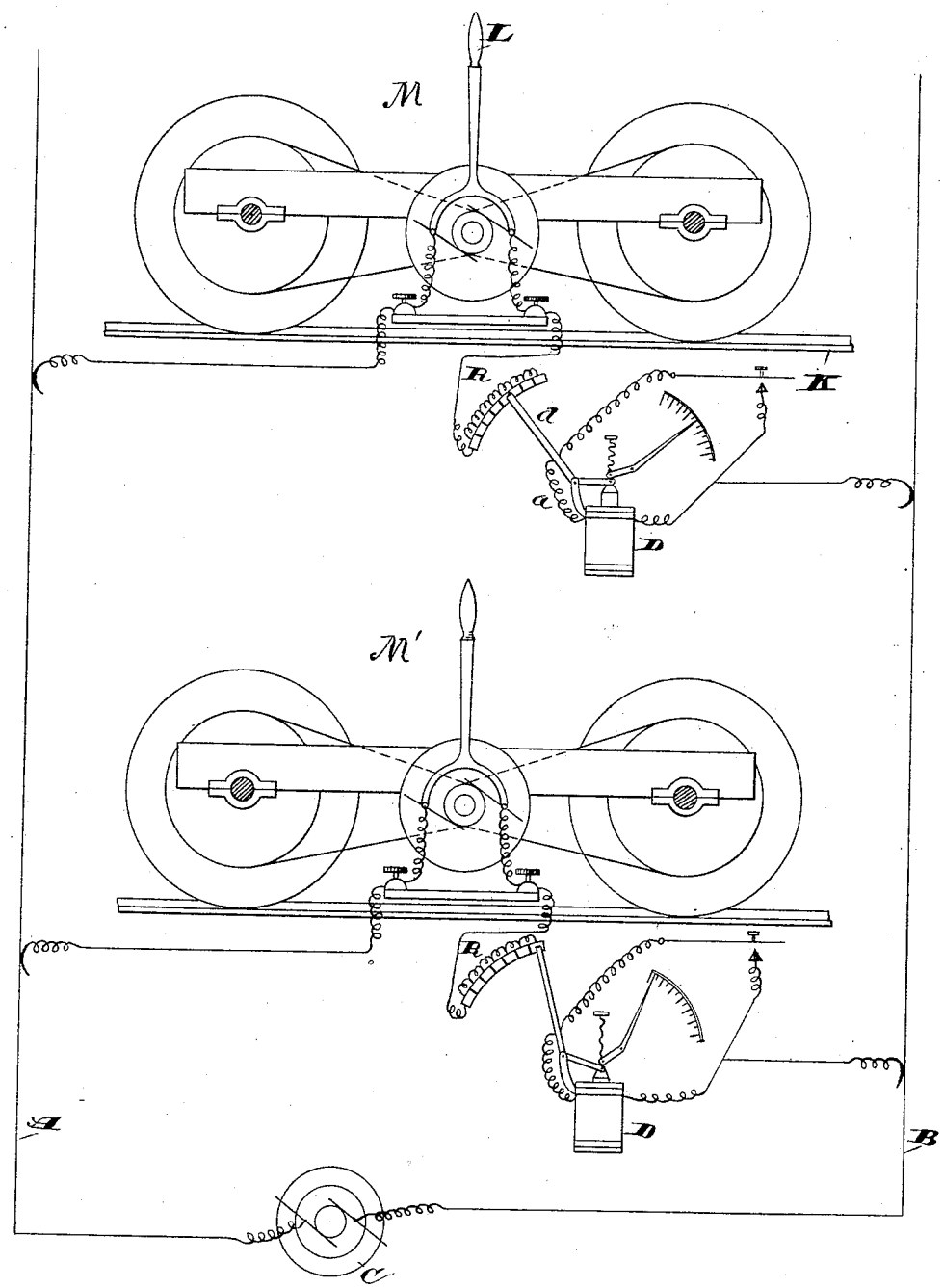
WITNESSES
Albert E. Lynch
Wm M Monroe
INVENTOR
Walter H. Knight
by Bentley & Knight
Attys.

UNITED STATES PATENT OFFICE.

WALTER H. KNIGHT, OF NEW YORK, N. Y.

ELECTRIC MOTOR.

SPECIFICATION forming part of Letters Patent No. 338,085, dated March 16, 1886.

Application filed July 10, 1885. Serial No. 171,191. (No model.)

*To all whom it may concern:*

Be it known that I, WALTER H. KNIGHT, a citizen of the United States, and a resident of New York city, New York, have invented certain new and useful Improvements in Electric Motors, of which the following is a specification.

My invention consists in certain devices by means of which two or more electric motors adapted to run at variable speeds may be operated in multiple arc.

It is well known that the resistance offered to the passage of the current through an electric motor varies with the counter electro-motive force of the motor, which is dependent upon the speed at which it runs, so that when two or more motors adapted to run at different speeds are in multiple arc with one another upon the same circuit the motor which is running at a slow speed offers less resistance than one which is running at a higher speed, and consequently tends to absorb an undue proportion of the current. This tendency, if unrestrained, will lead to the destruction of a slow-going motor by a surplus of current, while others upon the line will be left without sufficient current for their needs. I therefore place an automatic controller in the circuit of each motor, by which an artificial resistance is introduced whenever the current in the motor-circuit becomes abnormally great.

In the accompanying drawing, M and M' represent two electric motors in multiple arc from the two main conductors A B, C being the main generator. These two motors are represented as geared to the driving-wheels of an electric locomotive, and in this situation they will be required to run at variable speeds, occasioned by the variable load or by the circumstances of the railway. In the circuit of each motor is included an electro-magnet, D, and these electro-magnets each operate a variable resistance, R, in the circuit of their corresponding motors. Thus the circuit of motor M may be traced from the main conductor A, through the motor, to resistance R, to lever $d$, to wire $a$, magnet D, to main conductor B. In their normal condition the current in the motor-circuit will allow the magnet D to hold the lever $d$ at a point where little or no resistance will be included in the motor-circuit; but suppose that from any cause a motor, as M', should be running quite slowly, so that its counter electro-motive force is small, then the current passing through the motor will tend to become abnormally great, whereupon the magnet D will become stronger, and will throw the lever $d$ to a point where a great resistance is included in the motor-circuit. By this means an abnormal current can never pass through any motor, and no motor can rob others upon the line of their due share of the current.

With each magnet D, I provide an indicator, which will be placed in view of the operator on the locomotive, so that he can always know the amount of current passing through his machine. I also provide with each magnet a short-circuiting key, K, by means of which, when it is desired to increase abnormally the power of the motor for a moment—as, for example, at the instant of starting—the operator may press this key, and thereby shunt the current from the magnet, which instantly cuts out the resistance and allows a sudden impulse of current to be sent through the motor. This short-circuiting key is of course for the purpose of an emergency, and to be used but for a moment, so that the motor can never be burned out by an excess of current.

Levers L are shown connected to the brush-carrier of the motor and adapted to shift the brushes in either direction, so as to reverse the direction of rotation of the motor or control its speed at will.

Having thus described my invention, what I claim is—

1. The combination of two or more electric motors in multiple arc, a vehicle conveying and propelled by each, reversible commutator-brushes for each motor, and means controlled at will by the driver for actuating said brushes to change the direction of rotation of the motor, a resistance in each motor-circuit, and means for automatically controlling the same.

2. The combination, with an electric circuit, of two or more motors therein in multiple arc adapted to run at variable speeds, a speed-regulator for each motor under control of the operator, a resistance in each motor-circuit, and an electric device in said circuit connected with and controlling said resistance.

3. The combination of an electric motor, a vehicle driven thereby, a speed-regulator under the control of the operator, and an electrically-operated indicator in the motor-circuit carried by said vehicle.

4. The combination of two or more electric locomotives having their motors in multiple arc, means for controlling at will the speed of each locomotive, and a current-indicator carried by each locomotive.

5. The combination, with an electric circuit, of two or more electric motors in multiple arc therein, adapted to run at variable speeds, a speed-regulator for each motor under control of the operator, and an electric-current indicator in each motor-circuit placed in view of the operator.

6. The combination, with an electric motor adapted to run at a variable speed, and connected to main conductors, between which there is a constant difference of potential, of a resistance in the motor-circuit, automatic devices for increasing the resistance upon a decrease in the speed of the motor, and means for reducing the resistance at the will of the operator.

7. The combination of two or more motors in multiple arc, adapted to run at variable speeds, means with each motor for reversing the direction of rotation thereof, and an automatic current-regulator, with each motor adapted to keep a constant current in the motor-circuit.

8. The combination, with two or more electric locomotives having their motors in multiple arc, of a resistance in each motor-circuit carried by the locomotive, means controlled by the driver for cutting out said resistance, and an indicator, substantially as described.

9. The combination, with an electric motor on a multiple-arc circuit, of a variable load for the same, a resistance in the motor-circuit, and an automatic electrical controller for the same adapted to respond to a definite current.

In testimony whereof I sign this specification, in the presence of two witnesses, this 30th day of June, 1885.

WALTER H. KNIGHT.

Witnesses:
G. RENAULT,
HERBERT KNIGHT.